March 13, 1934.  C. W. SIEGWARTH  1,950,822
WINDOW INSTALLATION
Filed Dec. 12, 1930
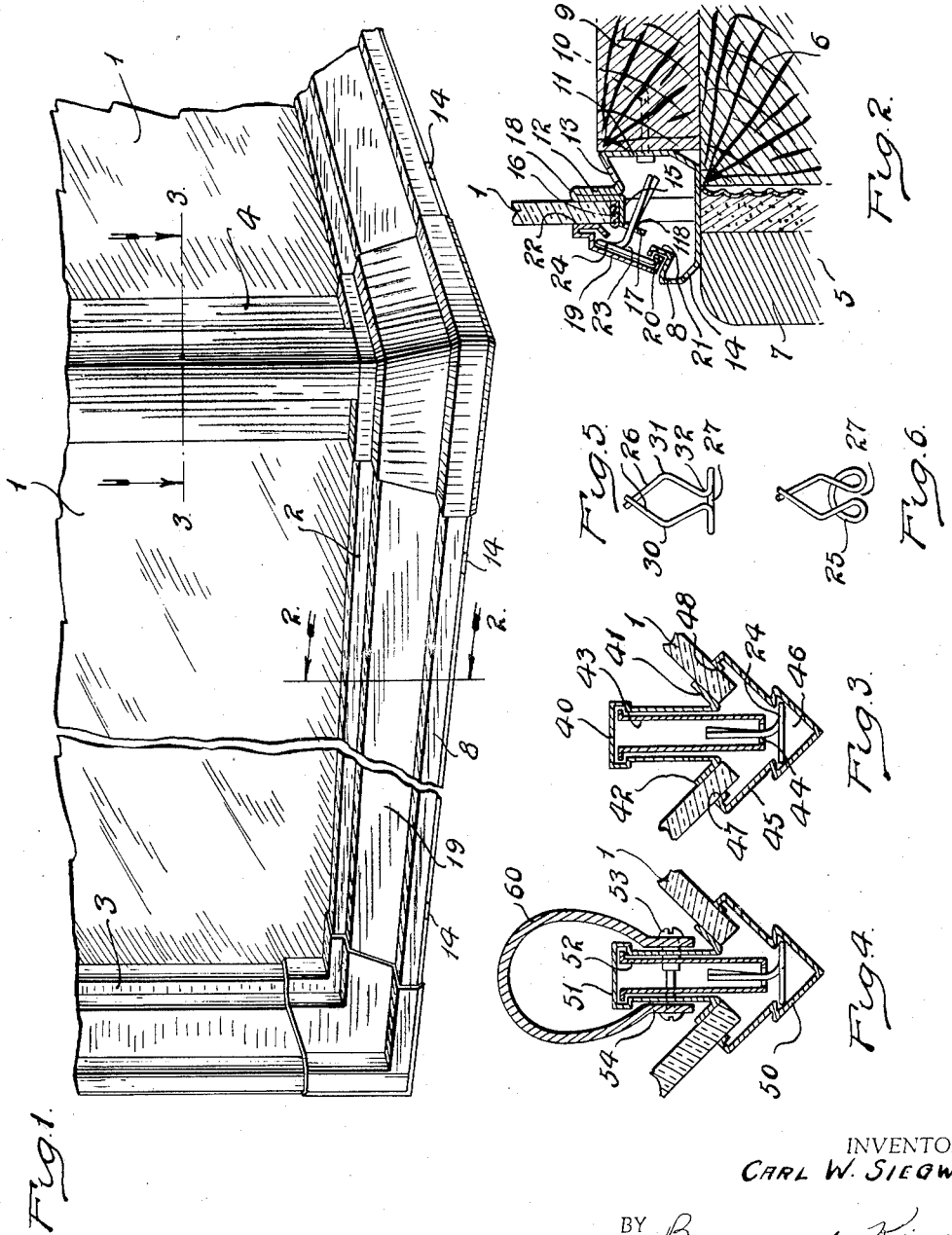
INVENTOR.
CARL W. SIEGWARTH.
BY Barnes and Kisselle
ATTORNEYS.

Patented Mar. 13, 1934

1,950,822

UNITED STATES PATENT OFFICE 1,950,822

WINDOW INSTALLATION

Carl W. Siegwarth, Detroit, Mich.

Application December 12, 1930, Serial No. 501,901

5 Claims. (Cl. 20—56.4)

This invention relates to a window installation and more particularly to a window installation for a plate glass store front.

In a window installation it is customary to provide a member which extends completely around the opening which is to be closed by the window glass. This member serves as a support along the bottom of the window glass and as a frame along the sides and the top of the window glass. Various means have been applied to this frame member to fix the window glass therein. Among these means might be mentioned the face piece which contacts with the window glass around the entire periphery and with the frame member and is fixed in position by means of suitable screws which pass through the frame member and into the bulkhead or frame support.

It is the object of this invention to produce a novel window installation comprising a frame member for holding the window glass and a second outer member for yieldably and removably retaining the said window glass in the frame.

In the drawing:

Fig. 1 is a fragmentary perspective of a plate glass store front installation.

Fig. 2 is a section along the line 2—2 of Fig. 1.

Fig. 3 is a section along the line 3—3 through the corner bar of the window installation.

Fig. 4 is a sectional view similar to that shown in Fig. 3 showing a modified form of this structure.

Figs. 5 and 6 show detailed views of the spring clip retaining member.

Referring more particularly to the drawing it will be seen that the store front comprises the window glass 1. The window glass may be plate, window, or any other type of glass. The window 1 is held in position by the window installation which is comprised generally of the bottom portion 2, side portion 3, and the corner portion 4. The side and bottom portions as well as the top portion (not shown) of the installation are all similar and hence merely the bottom portion of the installation will be described.

As nicely brought out in Fig. 2 the bottom portion 2 of the installation is supported by a bulkhead generally referenced 5. This bulkhead usually consists of a wooden frame or support member 6 with a marble, tile, or metal facing 7. The bulkhead 5 supports the frame member 8. The frame member 8 is backed up by the backing strip 9 and secured thereto by any suitable means such as the nails 10 which are passed through the back portion 11 of the gutter strip.

The frame member has a suitable trough-like configuration as at 12 extending lengthwise along the bottom of the window glass adjacent the front edge of the backing strip which serves as a gutter for any water which may flow from the window 1. The gutter strip 12 is provided with suitable openings 13 along the gutter through which the water which collects in the gutter can pass to the inside of the gutter strip and then outwardly through the openings 14 in the base of the frame member 8. The frame member is also provided with a flat longitudinally extending shelf portion 15 which is preferably provided with the strip of leather 16 or other soft material which cushions the base of the window glass 1, the window glass 1 being carried by the longitudinal shelf portion 15. The shelf 15 has projecting downwardly therefrom the lip 17 which is provided with a plurality of spaced openings 118.

After the window has been positioned in the window opening and seated on the leather strips 16 extending along the window support 15 it is backed up by the upstanding portion 18 of the gutter 12 and is arranged to be retained in this position by a suitable face piece 19. This face piece 19, as shown in Fig. 2, is provided with an inwardly turned portion 20 which is arranged to seat in the U-shaped socket 21 of the frame member 8. The upper edge of the face member 19 is turned back upon itself as at 22 to provide a flat surface for engagement with the window adjacent its outer edge which happens to be the lower edge of the window glass in this instance. The inwardly turned portions 20 and 22 of the face strip 19 provide a socket running longitudinally of the inside of the face strip 19, which socket may be referenced 23.

Since it is the object of this invention to retain the window glass in the frame yieldably and removably the face piece 19 is provided with a suitable longitudinal socket 23 in which are slidably mounted a plurality of spaced spring clips 24 shown in detail in Figs. 5 and 6. The spring clip 24 is preferably made from a strip of coil spring wire and consists of the head portion 25 and the up-standing spring fingers 26. The spring fingers 26 are preferably substantially normal to the plane of the head 25. The head 25 is preferably circular in conformation and preferably an arc somewhat greater than a semi-circle and less than a complete circle so as to provide an opening 27 between the neck of the spring fingers 26. By the neck of the spring fingers 25 is meant the portion of the fingers 26 adjacent the head 25. The fingers 26 are preferably in the form of opposed V's having the apexes 30 and 31 respectively. The opening 27 permits the spring fingers 26 to be moved inwardly toward each other so that the apexes 30 and 31 of the fingers approach each other to permit the fingers to be passed through the openings 118 in the spring clip lip 17 of the frame member 8.

In assembly, the required number of spring clips 24 are slid into the socket 23 of the face member so that the heads 25 of the spring clips are retained within the socket by means of the in-turned longitudinal edges 22 and 20 of the face strip. Hence, the clips 25 are freely movable longitudinally in the socket of the face strip 19 but cannot fall out or move laterally of the same. After the spring clips have been properly positioned in the face piece socket the face piece 19 is pressed forwardly so that the inverted V-fingers 26 of the spring clips are compressed by the openings 118 along the lip 17 of the frame member 8, thereby permitting the spring clip fingers 26 to pass through the openings 118 as soon as the apexes 30 and 31 have passed through the opening 118. The arcuate head 25 as well as the inherent resiliency of the spring fingers 26 cause the spring fingers 26 to expand so that the sides of the openings 118 in the lip 17 engage the spring clip 24 substantially in the sockets 32 formed by the junction of the head 25 with the spring fingers 26. The spring clips 24 thus retain the face piece 19 in yieldable engagement with the frame member 8 and with the window 1 along the face 22. This yieldable engagement permits the window glass to move or vibrate in its frame without breakage. Such vibrations are often set up when doors are slammed or heavy vehicles pass by along the roadway in front of the building. Hence, the face piece 19, in conjunction with the gutter strip particularly the window glass support portion 15 and the upstanding portion 18 along with the spring clips 25 provide a yielding socket for the window 1, which socket readily accommodates itself to the vibration waves which pass through the window.

In Fig. 3 I have shown the corner bar of the window installation. This corner bar installation consists of the inner vertical member 40 which extends from the top to the bottom of the window and is fixed at the top and bottom to the backing strip 9. The vertical member 40 has the lips 41 and 42 which engage the inside face of the window glass 1 adjacent to the edge thereof to serve as back support strips for the window. The vertical member 40 has fixed therein the U-shaped member 43 provided with suitable opening 44 therein which receive the spring clips 24 in the same way as that described above. In this instance the face piece of the corner bar consists of the V-shaped member 45 which is provided with a suitable socket 46 for the spring clips 24 and which is arranged to engage the two adjoining window glasses 1 along the faces 47 and 48.

In the modification of the corner bar shown in Fig. 4, the face piece 50 is retained in position in the same manner as the face pieces 19 and 45 described above. This structure is similar to that shown in Fig. 3, the only difference being that the inner vertical member 51 in this instance is provided with a U-shaped tubular cover 60 which is secured to the vertical member 51 and the inner U-shaped clip retaining member 52 by means of a plurality of screws 53 spaced vertically of the vertical member 51 and arranged to pass through the lips 54 of the tubular member 60 as well as the vertical member 51 and spring clip retaining member 52.

From the above description it is evident that there is herein disclosed a novel window installation essentially characterized by a supporting frame member arranged to receive the window glass in combination with a face piece co-extensive with the window glass frame and cooperating with the window glass frame to form a yieldable socket which will adjust itself to the window glass while the window is at rest as well as while the window is vibrating.

I claim:

1. A window glass installation comprising in combination of a metal window frame having a seat arranged to receive a window glass, a metal face strip having a longitudinal socket therein, and a plurality of spring clips slidably mounted in the said socket for yieldably securing the said face piece to the said window frame member to yieldably retain the window in position.

2. A window glass installation comprising in combination of a metal frame member having a seat portion arranged to receive a window glass and a plurality of spaced openings, a rolled face piece having in-turned ends forming a socket longitudinally thereof, and a plurality of headed spring clips, the heads of said clips arranged to slidably engage the said face piece socket and to engage the frame member in the said openings to yieldably retain the said face piece in engagement with the frame member and the window glass to hold the window glass in position.

3. A window glass installation comprising in combination of a metal frame member having a seat portion arranged to receive a window glass and a plurality of spaced openings, a rolled socket face piece, a plurality of arcuately headed clip members having substantially inverted V-shaped fingers extending laterally of the plane of the head portion of the said clip, the head of said clip arranged to be slidably retained in the said socket of the face strip and passed through the openings in the said frame supporting member so that the spring clips engage the openings adjacent the head portion of the spring clip whereby the face piece and the frame member are secured together to form a yieldable socket for the said window glass.

4. A window glass installation comprising in combination a metal frame member having a seat portion adapted to receive the window glass, the said frame member having a plurality of spaced openings, a metal face piece having a longitudinal channel portion, the ends of which are turned inwardly to form a longitudinal socket, a plurality of spring clips each having a head adapted to slidably engage the channel socket and be retained therein by the inwardly turned ends, the said face piece being adapted to be secured to the frame member by passing the spring clips through the spaced openings whereby the face piece cooperates with the frame member to yieldably secure the window in the frame and the headed clips may be adjusted along the face piece to coincide with the openings.

5. A window glass installation comprising in combination a metal frame member having a seat portion adapted to receive the window glass and a lip portion extending along the seat portion, the said lip portion having a plurality of spaced openings, a metal face piece having a longitudinal channel portion, the ends of which are turned inwardly to form a longitudinal socket, a plurality of spring clips each having a head adapted to slidably engage the channel socket and be retained therein by the inwardly turned ends whereby the headed clips may be adjusted along the face piece to coincide with the openings, the said face piece being secured to the frame member by passing the spring clips through the spaced openings in the lip of the frame member, the said spring clips having a yielding engagement with the lip member in the said openings whereby the window is yieldably secured in the frame.

CARL W. SIEGWARTH.